Oct. 26, 1954  K. LANDOLT  2,692,471
BEARING FOR DOUBLE-TWIST SPINDLES
Filed Aug. 11, 1950
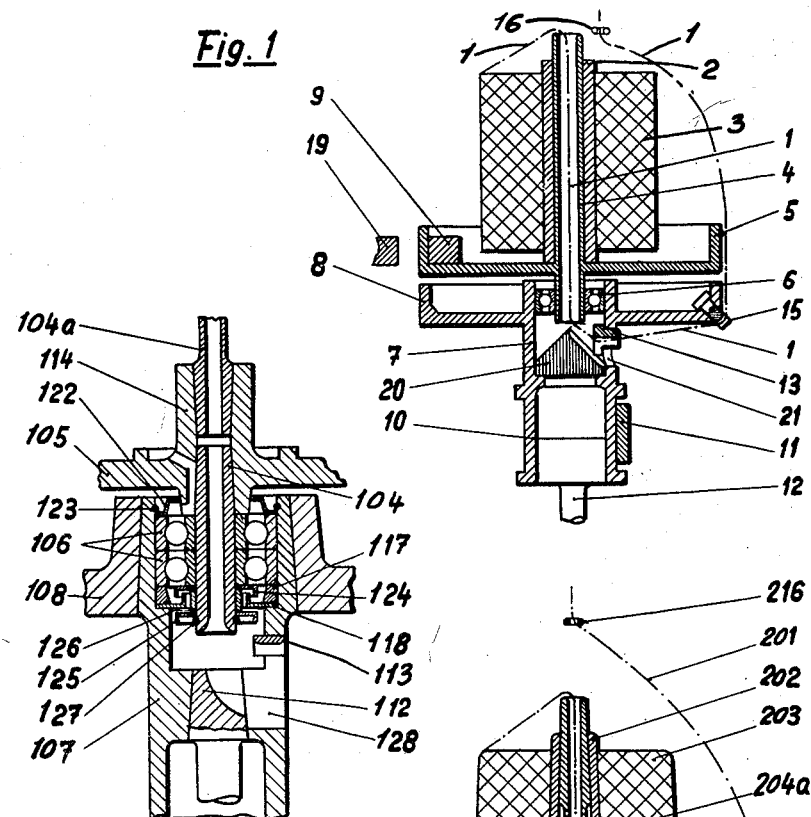
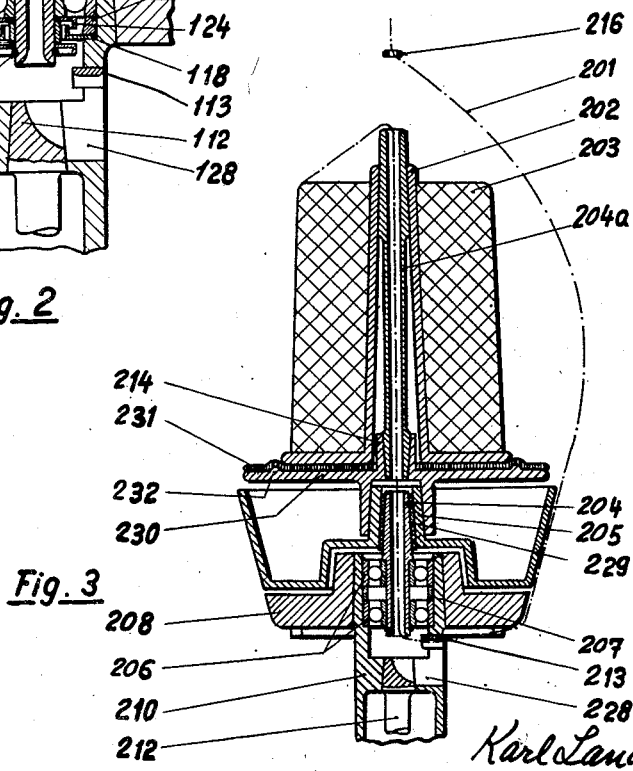
Karl Landolt
INVENTOR.
BY Robert C. Burns

UNITED STATES PATENT OFFICE 2,692,471

BEARING FOR DOUBLE-TWIST SPINDLES

Karl Landolt, Zurich, Switzerland

Application August 11, 1950, Serial No. 178,851

Claims priority, application Switzerland
October 12, 1949

4 Claims. (Cl. 57—58.49)

The present invention relates to an improved bearing support for the stationary part of double-twist spindles. My improved bearing makes it possible for the spindles to be of simplified form, and also facilitates the threading-in of the yarn. My bearing construction has the further advantage that it may be lubricated with very liquid oil, the excess oil being retained in a small storage chamber and the mechanical stress on the bearing being minimized. The essential features of the bearing of the invention reside in the fact that the stationary inner part of the double-twist spindle is supported by anti-friction bearings in a tubular portion of the rotary body, whereby the outer race of the bearing rotates, and in the center of the tubular portion of the rotary body there is an inset having a curved groove which communicates both with a slot in the tubular part and with the central bore of the stationary part. At least at the lower end of the bearing a rotating circular trough is arranged for the inner stationary parts. The mechanical stress on the bearing is reduced in that the stationary parts within the spindle are associated with the bearing by means of at least one flexible member. According to the invention, a particularly advantageous construction is obtained by reason of the fact that the inset in the tubular part of the rotary body is integral with the spindle shaft which has the rotary part mounted upon it.

The accompanying drawing shows, by way of example, illustrative embodiments of the invention.

Fig. 1 is a sectional view showing a double-twist spindle embodying features of the invention;

Fig. 2 is a similar view of another embodiment; and

Fig. 3 is a sectional view of a further embodiment.

Referring particularly to Fig. 1, the thread 1 is taken up over head from a thread body 3 wound upon a tube 2 non-rotatably supported on tube 4 of the stationary body 5, being itself supported by ball bearings 6 in the tubular portion 7 of the rotary body 8. The body 5 is held at rest by means of a magnet 19 and a counter-magnet 9 mounted on body 5. The tubular portion 7 of the rotary body 8 defines the wharve 10 driven by a belt 11 in the usual manner. The wharve 10 is rigidly connected to the spindle 12, the latter being supported by conventional means.

The thread 1 passes through the stationary tube 4 and is led over the thread guiding members 13 and 15 to the outer rim of the rotary body 8. The thread then passes the periphery of the body 5 and passes, with the formation of a so-called balloon, through the eyelet 16, from which it is fed to the desired point.

The tubular part 7 of the rotary body permits the provision of an inset 20 having a surface sloping toward the slot 21, a thread-guide body being positioned as shown at 13, which, according to the invention, has the shape of a horse-shoe and forms the upper closing of the slot 21 in the tubular portion 7. Other thread-guide bodies, such as shown at 15, are preferably of such design that they include lateral projections directed outwardly from inside the rotary body, these projecting portions preventing throwing off of the thread.

In the embodiment shown in Fig. 2, wherein corresponding parts are designated by the same reference numerals used in Fig. 1 with the addition of 100, the tubular portion 107 is attached to the spindle shaft 112 and is itself supported in conventional manner. Seated on the tubular portion 107 is the rotary body 108 which could, if desired, be formed integrally with the tubular body 107. It is, however, preferable to have it made separately, because then it may be manufactured from light material, such as Bakelite (phenol-aldehyde resin) with a fabric insert. The tubular body 107 accommodates the two ball bearings 106 which, however, could be replaced by a single bearing. Seated within the bearing 106 is the stationary tube 104 having the stationary part 105 mounted upon it by means of the tubular extension 114. The stationary part 105 is normally designed as a thread guiding body. Characteristic of the structure of the invention are those portions of the device positioned beneath the ball bearing 106, i. e. the rotating ring 117 seated within the tubular portion 107, which ring, together with the similarly-mounted upwardly flanged sheet-iron 118, forms the so-called rotating trough. Both of the members 117 and 118 are fixed within the tubular part 107 in such manner that substantially no oil can percolate between them. Therefore, they may be soldered or melted together or even be formed as one piece, or alternatively, a packing may be interposed between them or around them. A similar trough 122, held in place by the spring ring 123, is provided above the bearing. Downwardly flanged discs 124 and 125 are held in contact with the stationary tube 104 along with the spacer ring 126 by means of the spring ring 127.

At the top the bearings are held by the extension 114 of the stationary body 105, whereby, according to the invention, the oil supply enters from the top through the tubular extension 114 of body 105 positioned above the ball bearings 106 on the stationary tube 104. The oil supplied passes the ball bearings and drips over the disc 124 into the rotating trough 117, 118. There the oil is collected until it overflows and runs along the spacer ring 126 and drips onto the downwardly flanged disc 125, leaving the tubular part through slot 128. It is important to prevent the dripping oil from soiling the thread guiding body 113, since otherwise the thread reaching the outer contour of the rotary body 108 through the interior of tube 104 through aperture 128, is likely to be smudged. When the spindle starts to rotate, the oil tends to rise from the trough 117, 118 into the ball bearing. But it is only permitted to reach the upper groove 122. On stoppage of the spindle the oil is recollected in the groove 117, 118. Trough 117, 118 and groove 122 as well as the discs 124 and 125 cooperate to ensure a very efficient seal and protection from dust.

In Fig. 3 the shaft 212 is, as with ordinary spindles, supported in a casing (not shown). Attached to its top is the wharve 210 with tapered seat and tubular extension 207. Outside the wharve, the rotary body 208 is seated, and mounted within the tubular extension 207 are the two ball bearings 206 carrying the stationary tube 204 with their inner races. Seated on the upper tapered end of tube 204 is the flexible sleeve 229 which in turn carries the stationary body 205. The tube 204a is connected to the stationary body 205 through a tubular socket 214 integral with a supporting disc 230 on which is positioned a vibration damping sheet 231. The tubular thread body support 202 is seated on the upper end of tube 204a and is supported on the damping sheet 231.

From the thread body 203 the thread 201 runs to the upper inlet of tube 204a, passes through it, then passes through tube 204 and leaves the wharve through slot 228 and thread-guide 213. Thence the thread swings in the form of a balloon around the rotatable body 208 and the stationary body 205 to the upper eyelet 216, whence it is carried to the winder (not shown).

In practice, small vibrations of the shaft 212 cannot be avoided and they are transferred to the bearings 206 and tube 204. They may, however, be damped to an appreciable extent by reason of the provision between stationary body 205 and stationary shaft 204 of the sleeve 229 of flexible material, say, rubber. Above all it is important, however, that these vibrations be not transferred to the members 202, 203. In accordance with the invention such vibration transfer is prevented by reason of the fact that the tubular support 202 is supported on tube 204a which in turn is supported on the tubular extension 214 which is preferably formed from plastic material. It will be clearly seen that the oscillations of shaft 212 would greatly increase toward the top of tube 204a if this were not prevented by at least one of the flexible intermediate members 229 or 214. The longer and thinner the tube 204a is, the quieter its top will be. For this reason the tubular support 202 contacts neither the lower portion of tube 204a nor the extension 214, because, according to the invention, it rests upon a damping sheet 231 which preferably is formed from textile material, e. g. velvet, or animal hides.

In order to center and guide lower flange of the support 202 to some extent, the disc 230 may be provided with an annular ridge 232.

Alternatively, the flexible sleeve may be omitted, especially if the body 205 is formed from comparatively light material, because the socket 214 and the thin-walled and hence also elastic tube 204a will damp the oscillations sufficiently, that they will not be transferred to the support 202. In this case the body 205, the socket 214 and the disc 230 may be united to form an integral unit.

What I claim is:

1. In a double-twist spindle comprising a stationary body and a rotatable body having a tubular portion, anti-friction bearing means supporting the stationary body in the tubular portion of the rotatable body, the outer race of the bearing means being rotatable with the rotatable body, said stationary body having a vertical downwardly extending axial bore through which the thread is adapted to pass and to enter the tubular portion of the rotatable body, said rotatable body having a slot for permitting the thread to pass freely to the exterior thereof, means defining an annular chamber rotatable with said rotatable body below the anti-friction bearing means, said chamber being adapted to hold a predetermined quantity of oil, the inner diameter of said chamber being less than the inner diameter of the outer race of the bearing means whereby the oil from the bearings is caught by the chamber when the spindle is stationary, the oil in said chamber being thrown by centrifugal force into the bearings upon rotation of said chamber during rotation of said rotatable body.

2. In a double-twist spindle comprising a stationary body and a rotatable body having a tubular portion, anti-friction bearing means supporting the stationary body in the tubular portion of the rotatable body, the outer race of the bearing means being rotatable with the rotatable body, said stationary body having a vertical downwardly extending axial bore through which the thread is adapted to pass and to enter the tubular portion of the rotatable body, said rotatable body having a slot for permitting the thread to pass freely to the exterior thereof, means defining an annular chamber rotatable with said rotatable body below the anti-friction bearing means, said chamber being adapted to hold a predetermined quantity of oil, the inner diameter of said chamber being less than the inner diameter of the outer race of the bearing means whereby the oil from the bearings is caught by the chamber when the spindle is stationary, the oil in said chamber being thrown by centrifugal force into the bearings upon rotation of said chamber during rotation of said rotatable body, and a stationary annular member disposed below said bearing means and having a downwardly directed flange extending into said chamber for conducting oil flowing from said bearings into said chamber.

3. In a double-twist spindle comprising a stationary body and a rotatable body having a tubular portion, anti-friction bearing means supporting the stationary body in the tubular portion of the rotatable body, the outer race of the bearing means being rotatable with the rotatable body, said stationary body having a vertical downwardly extending axial bore through which the thread is adapted to pass and to enter the tubular portion of the rotatable body, said rotatable body having a slot for permitting the thread to pass freely to the exterior thereof, means defining an annular chamber rotatable with said rotatable body below the anti-friction bearing means, said chamber being adapted to hold a predetermined quantity of oil, the inner diameter of said chamber being less than the inner diameter of the outer race of the bearing means whereby the oil from the bearings is caught by the chamber when the spindle is stationary, the oil in said chamber being thrown by centrifugal force into the bearings upon rotation of said chamber during rotation of said rotatable body, a stationary annular member disposed below said bearing means and having a downwardly directed flange extending into said chamber for conducting oil flowing from said bearings into said chamber, and a second stationary disc disposed below said bearing means and having a downwardly directed flange extending into said chamber for deflecting any excess oil flowing from the chamber away from the stationary body.

4. In a double-twist spindle comprising a stationary body and a rotatable body having a tubular portion, anti-friction bearing means supporting the stationary body in the tubular portion of the rotatable body, the outer race of the bearing means being rotatable with the rotatable body, said stationary body having a vertical downwardly extending axial bore through which the thread is adapted to pass and to enter the tubular portion of the rotatable body, said rotatable body having a slot for permitting the thread to pass freely to the exterior thereof, means defining an annular chamber rotatable with said rotatable body below the anti-friction bearing means, said chamber being adapted to hold a predetermined quantity of oil, the inner diameter of said chamber being less than the inner diameter of the outer race of the bearing means whereby the oil from the bearings is caught by the chamber when the spindle is stationary, the oil in said chamber being thrown by centrifugal force into the bearings upon rotation of said chamber during rotation of said rotatable body, and an annular shield member rotatable with said rotatable body overlying the bearing means and positioned to deflect downwardly oil thrown upwardly from said chamber.

References Cited in the file of this patent

UNITED STATES PATENTS

| Number | Name | Date |
|---|---|---|
| 149,089 | Bartley | Mar. 31, 1874 |
| 914,794 | Coe | Mar. 9, 1909 |
| 1,793,190 | Philips | Feb. 17, 1931 |
| 1,823,638 | Andrew et al. | Sept. 15, 1931 |
| 2,125,823 | Stoddard | Aug. 2, 1938 |
| 2,146,578 | Honig | Feb. 7, 1939 |
| 2,208,742 | Archer | July 23, 1940 |
| 2,245,564 | Bergmann et al. | June 17, 1941 |
| 2,374,085 | Gwaltney et al. | Apr. 17, 1945 |
| 2,379,806 | Kent | July 3, 1945 |
| 2,411,126 | Burnham | Nov. 12, 1946 |
| 2,473,521 | Gwaltney | June 21, 1949 |
| 2,559,735 | Roberts | July 10, 1951 |
| 2,565,389 | Meadows | Aug. 21, 1951 |